2,862,874
CONVERSION OF HYDROCARBONS

Edward R. Boedeker and Saul Gerald Hindin, Wilmington, Del., assignors to Houdry Process Corporation, Wilmington, Del., a corporation of Delaware No Drawing. Application January 18, 1952
Serial No. 267,196

2 Claims. (Cl. 208—110)

The present invention relates to catalytic processes for treatment of hydrocarbons and relates particularly to methods for the production of hydrocarbon conversion products characterized by high yields of liquid products including gasoline with relatively low production of less desirable products such as gas. More particularly, the invention is directed to improvements in these methods effected by contacting hydrocarbon fractions under conditions of elevated temperature and pressure with catalysts having the dual function of (1) catalyzing carbon-carbon scission of the larger hydrocarbon molecules and (2) catalyzing hydrogenation of the unsaturated hydrocarbon molecules and radicals present or thus formed, in the presence of added hydrogen, and under selected operating conditions.

In commercial cracking operations the rate of formation of undesirable products, such as gases and coke, limits the severity of conditions that can be employed for efficient and economic operation, so that the extent of conversion of the oil is maintained below that resulting in the highest gasoline yields per pass. Also at these conversion levels the quantity of coke produced represents not only loss of charge, but reduces the on-stream operating period by the required frequency of catalyst regeneration.

Among the objects of the present invention is to provide an improved catalytic process for the conversion of hydrocarbons which is characterized by relatively low yields of undesirable gaseous products and coke, at acceptable levels of gasoline production.

According to the present invention, hydrocarbon feed material of above gasoline boiling range is converted into products that are characterized by a high ratio of gasoline to total gas by contacting the feed material with a dual function catalyst composite comprising a small amount, as in the order of less than about 1% by weight of a hydrogenation promoting component associated with a siliceous base having low but appreciable cracking activity. The conversion is effected at a pressure in the range of about 1500 to 3500 pounds per square inch, a temperature in the range of about 800° to 1075° F., a liquid hourly space velocity up to about 5, and in the presence of at least about 3 moles of hydrogen per mole of feed.

The dual function catalyst composite, as above set out comprises a siliceous cracking component having relatively low cracking activity. In terms of the standard CAT-A method, hereinafter described, the cracking activity of the siliceous base, before incorporation of the hydrogenative component therein, should be in the range of about 7 to 25, and preferably in the range of about 10 to 20. This cracking component may be derived from any of the siliceous materials normally used as cracking catalysts.

The CAT-A method of determining cracking activity is described in detail by J. Alexander in Proc. Am. Petroleum Inst. (III), volume 27, page 51 (1947), and involves passing a standard gas oil over the catalyst being tested, at 800° F. for a ten-minute period at 1.5 liquid hourly space velocity and measuring the products— gasoline, gas and coke—under well-defined conditions. The volume percent gasoline produced from the gas oil is the value given as the CAT-A activity of the catalyst.

Natural or synthetic silica-alumina type cracking catalysts may be used as the cracking component of the dual function catalyst after they have been treated to reduce their catalytic activity to the desired CAT-A value. This treatment may consist of heat treating the dried catalyst for sufficient time at temperatures above about 1500-1600° F., or steam treating the catalyst for a sufficient period at above 1300° F., as for 4 to 10 hours or more. Naturally occurring clays including kaolins, as well as montmorillonite clays that have not been acid-activated but have been only washed and heat treated until their catalytic activities fall within the desired CAT-A value range, also can be used as the base component. In addition, active cracking catalysts of various types can be used after reducing their activity to a value within the recommended CAT-A value range by treating the active catalyst to incorporate therein alkali metal ions or one or more of the alkaline earth metal ions such as calcium, strontium and barium.

As the hydrogenation promoting component of the catalyst there may be employed any of the known agents for this purpose including the oxides of metals of group VI of the periodic table, particularly the oxides of molybdenum; and metals and oxides of group VIII, such as nickel. The noble metals of the latter group may be employed but are quite costly.

Preferred catalysts, for use in the method of the invention, are those in which the base or cracking component has a CAT-A value of about 15 and contain about 0.3 to about 0.6% by weight of the composite catalyst of molybdenum oxides determined as $MoO_3$. The catalysts described characteristically produce relatively small amounts of gas in hydrogenative cracking as compared to catalysts comprising a cracking component of higher cracking activity, as those having CAT-A values above about 25 to 30. On the other hand, catalysts comprising a base having CAT-A values below about 7 are generally not recommended because their use tends to result in undesirably low conversion levels under acceptable operating conditions.

The hydrogenative component of the composite catalyst can be incorporated in the base catalyst by any suitable method. For example, molybdenum oxides can be incorporated in the base catalyst as follows. The desired amount of ammonium molybdate is dissolved in an amount of water which will be absorbed by the amount of base catalyst employed for the incorporation. The base catalyst is impregnated with this solution, and is then dried and heated to about 1000° F. for about 3 hours to convert the absorbed ammonium molybdate to oxides of molybdenum.

Relatively severe conditions of temperature, pressure and space velocity are preferably employed in the method of the invention. Such operating conditions are chosen to obtain the desired conversion levels as well as a desirable products distribution, i. e., high gasoline to total gas and coke weight ratios, as well as an acceptably high yield of desirable aromatic hydrocarbons.

Accordingly, temperatures below about 800° F. are not recommended because undesirably low conversions are usually obtained at such low temperatures. Satisfactory conversions can be obtained at about 900° F., when sufficiently high pressures, i. e., above about 1500 pounds per square inch gauge are employed together with relatively low liquid hourly space velocities such as about 2 or lower. Temperatures above about 1075° F. are not recommended because relatively poor product distribution is usually obtained at such higher temperatures. Temperatures of up to about 1075° F. are satisfactory, however, in which case fairly high liquid hourly space velocities are used as up to about 5. Pressures below about 1500 pounds per square inch gauge are not recommended because such lower pressures tend to result in lower conversions, the production of gasoline of lower octane number and of larger amounts of gas and coke in relation to gasoline.

Hydrogen is introduced into the reaction zone usually in admixture with the hydrocarbon feed material, and at a rate of at least 1 and preferably 3 or more moles of hydrogen per mole of hydrocarbon feed. Increased amounts of hydrogen, in excess of about 10 moles of hydrogen per mole of feed, do not appear to offer any advantage.

The space velocity of the hydrocarbon feed relative to the space occupied by the catalyst in the conversion zone is controlled to obtain favorable product distribution. Thus, when employing the lower temperatures in the range described above, i. e., about 800° F., liquid hourly space velocities as low as about 0.1 volume of oil per volume of catalyst are recommended, while at the higher operating temperatures higher space velocities going up to about 5 volumes of oil per hour per volume of catalyst may be employed to obtain good product distributions and relatively low gas and coke formation relative to gasoline production.

The following example illustrates the preparation of a typical catalyst and use of the catalyst in the catalytic hydrocarbon conversion process of the invention:

EXAMPLE I

The catalyst composite employed in this run contained 0.5 weight percent of molybdenum oxides determined as $MoO_3$ impregnated on a commercial type silica-alumina base catalyst which was prepared as follows:

Sodium silicate and sodium aluminate were coprecipitated from solution with ammonium sulfate to form a coagulum. The resulting coagulum was dried and coarse ground. The ground material was treated with ammonium nitrate solution and water to remove sodium, then freed of excess water on a filter press. A paste of the filter cake was molded into cylindrical pellets of about 4 mm. diameter and 4 mm. length. The pellets were dried and heat treated at 1500° F. for 10 hours in an atmosphere of 100 percent steam. The resulting base catalyst pellets had a CAT-A value of 16, and consisted of 87.5 weight percent $SiO_2$, 12.5 weight percent $Al_2O_3$.

The resulting base catalyst pellets were impregnated with molybdenum oxides by dissolving an appropriate amount of ammonium molybdate in a mass of water equal to about half the mass of the base catalyst to be impregnated. The base catalyst was soaked with the ammonium molybdate solution; and was then dried and heated to 1000° F. for 3 hours.

A light East Texas gas oil of 35.5° API gravity, containing less than 15 percent aromatics, and boiling in the range of about 413° to 712° F. was passed over the composite catalyst under the following average operating conditions: temperature of 900° F., pressure of 2500 p. s. i. g., liquid space velocity of 1 volume of feed per volume of catalyst per hour, hydrogen added to the reaction zone at the rate of 5.3 moles hydrogen per mole feed (average molecular weight 240), for an on-stream operating period of one hour.

The data obtained are summarized on a loss-free basis in the following table:

Table I

| | Wt. percent of feed oil |
|---|---|
| Liquid product | 89.7 |
| Dry gas | 4.4 |
| Butanes | 4.4 |
| Hydrogen | 0.9 |
| Coke | 0.6 |

Conversion (vol. percent of feed oil)=48+.

By fractional distillation of the liquid product, 41.6% thereof was recovered as butane-free gasoline.

Analysis and inspection of the gasoline produced, indicated its composition to be 21 percent aromatics, 5 percent olefins, 21 percent naphthenes and 53 percent paraffins; and its CFR-M octane number to be 63.3. The computed gasoline to dry gas plus butanes weight ratio was 4.8.

EXAMPLE II

The catalyst of the preceding example was also tested in hydrocracking of a heavier gas oil fraction composed of 56-77% cut of East Texas crude oil (56% as lower boiling and 23% as higher boiling products removed), which cut boils in the range of approximately 540-930° F. and has an API gravity of 29.0. Subjected to hydrocracking in the presence of the described catalyst at 900° F., pressure of 2500 pounds per square inch gauge, at a liquid space velocity of 2 and with addition of 4.7 mols $H_2$ per mole of oil charged, the following yields were obtained (loss-free basis) during the third hour period of on-stream operation:

| Gasoline | | $C_4$, Wt. Percent | Dry gas, Wt. Percent |
|---|---|---|---|
| Wt. Percent | Vol. Percent | | |
| 33.8 | 40.0 | 6.2 | 0.4 |

Coke production over a three-hour period of operation did not exceed about 0.2% by weight of the hydrocarbons charged.

Thus the method of the present invention is characterized by the use therein of a composite catalyst comprising a base catalyst of relatively low catalytic activity, and a relatively small amount of a hydrogenative catalyst. The two functions of the composite catalyst, i. e., the cracking function and the hydrogenating function, are so balanced that a relatively high gasoline to gas ratio is obtained in the conversion product together with minimum coke production.

Since use of this type of catalyst at milder operating conditions results in relatively low conversions of the hydrocarbon feed per pass, relatively severe conditions of temperature, pressure and space velocity are best employed in carrying out the method of the invention. The use of such severe operating conditions does not result in the production of large amounts of gas and coke relative to the amount of gasoline produced, because the hydrogenation and aromatization reactions that take place during the conversion stage are more temperature sensitive than the cracking reaction, and the use of the more severe operating conditions with the particular type of dual function catalyst in the method of the invention results in a very favorable product distribution at a satisfactory conversion level.

While higher conversion levels are possible by certain known conversion methods, the method of the invention offers favorable economic advantage by virtue of the fact that only relatively small amounts of gas and coke are produced and very high liquid recoveries are obtained. The higher liquid recoveries permit repeated separation of gasoline from the large amount of recovered liquid and continuous recycle operations on the recovered liquid heavier than gasoline. In addition, the low coke formation permits very long on-stream operations before catalyst regeneration is indicated.

Obviously many modifications and variations of the invention as hereinbefore set forth may be made without departing from the spirit and scope thereof and therefore only such limitations should be imposed as are indicated in the appended claims.

We claim as our invention:

1. The method of converting a hydrocarbon feed material boiling above the gasoline range into products characterized by a high gasoline to total gas ratio, which comprises contacting the feed with a catalyst composite comprising about 0.3 to 1.0 weight percent of the composite of a hydrogenating component selected from the group consisting of oxides of metals of group VI and metal oxides of group VIII of the periodic table incorporated in a siliceous base catalyst having a CAT-A value in the range of about 10 to 20, at a pressure above about 2500 pounds per square inch gauge, a temperature above about 900° F., a liquid hourly space velocity as low as about 0.1, and in the presence of at least 3 moles hydrogen per mole of feed.

2. The method of converting a hydrocarbon feed material boiling above the range of gasoline into products characterized by a high gasoline to total gas ratio, which comprises contacting the feed with a dual function catalyst composite comprising a base catalyst having a CAT-A value in the range of about 7 to 25 and as a hydrogenating component impregnated in the base catalyst up to 1% by weight molybdenum oxides determined as $MoO_3$; at a pressure in the range of about 1500 to 3500 pounds per square inch gauge, a temperature in the range of about 800° to 1075° F., a liquid hourly space velocity up to about 5, and in the presence of at least 3 moles hydrogen per mole feed.

References Cited in the file of this patent

UNITED STATES PATENTS

| | | |
|---|---|---|
| 2,450,316 | Voorhies et al. | Sept. 28, 1948 |
| 2,464,539 | Voorhies et al. | Mar. 15, 1949 |
| 2,550,531 | Ciapetta | Apr. 24, 1951 |
| 2,763,623 | Haensel | Sept. 18, 1956 |

OTHER REFERENCES

Kastens et al.: "Industrial and Engineering Chemistry," vol. 41, pp. 870–885 (1949).